No. 672,633. Patented Apr. 23, 1901.
M. VIDIE.
RAILWAY BRAKE.
(Application filed June 29, 1900.)
(No Model.)
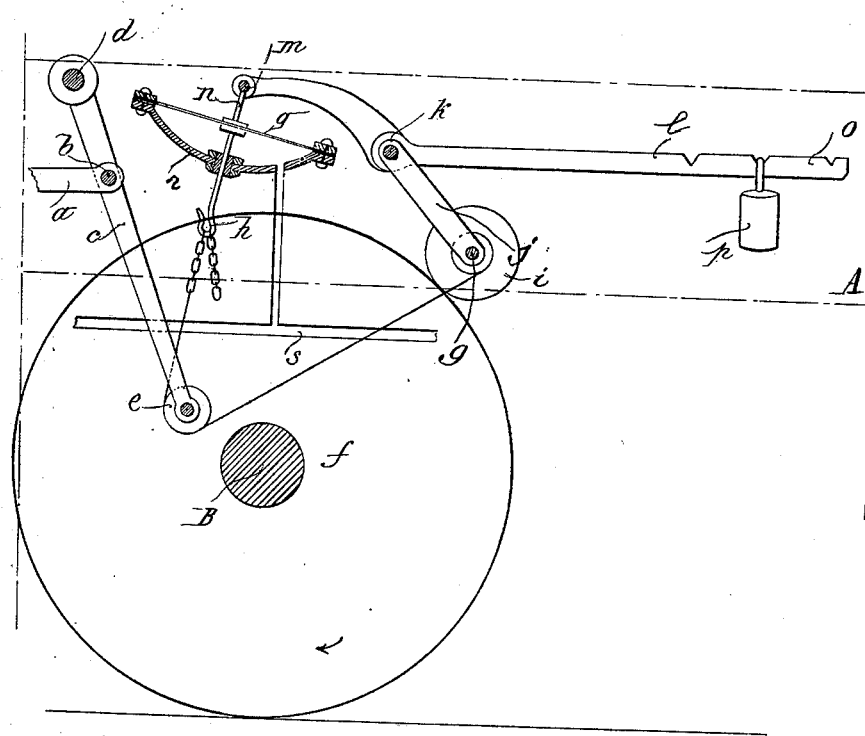
Witnesses
Inventor
Maurice Vidie
By James L. Norris
atty

UNITED STATES PATENT OFFICE.

MAURICE VIDIE, OF PARIS, FRANCE.

RAILWAY-BRAKE.

SPECIFICATION forming part of Letters Patent No. 672,633, dated April 23, 1901.

Application filed June 29, 1900. Serial No. 22,071. (No model.)

*To all whom it may concern:*

Be it known that I, MAURICE VIDIE, a citizen of the Republic of France, residing at 74 Boulevard Haussmann, Paris, France, have invented certain new and useful Improvements in Railway-Brakes, of which the following is a specification.

The present invention has for its object improvements in railway-brakes, the purpose being to render these brakes much less expensive, while giving to them certain qualities which brakes now in use do not possess.

My brake is of the type which derive their force from the actual rotation of the axles and of the wheels which it is desired to brake. It utilizes the existing brake-gear of the vehicles by acting on the controlling connecting-rod of this brake-gear through a cable winding itself onto a drum which is set in movement by the wheels themselves. My system is characterized by the general arrangement of the means employed to render it practically utilizable.

The annexed drawing, which is merely a diagram, shows by way of example the arrangement of a brake according to the present invention.

A represents the under framing of a car. B is an axle of the same.

$a$ is the brake-gear-controlling lever or bar. It is upon this bar that attraction must be exerted to apply the brake-blocks against the tires of the wheels. To this end the extremity of the bar $a$ is connected by a pin $b$ to a lever $c$, pivoting about the axis $d$ and carrying at its other end a pulley $e$. Over this pulley passes a cord $f$, the free end of which is wound onto a drum $g$, the other end being attached to a hook $h$. Upon the axle of the drum $g$ is keyed a driving-disk $i$, and the axle itself is carried by a fork $j$, keyed to the pin $k$. On the same pin $k$ is keyed another lever $l$, one end of which, $m$, is connected by a rod $n$ to the hook $h$, and the other end of which, $o$, is provided with notches in which one can place an adjustable counterbalancing-weight $p$. On the rod $n$ is fixed in any appropriate manner an elastic diaphragm $q$, serving as a cover for a dish $r$, which communicates with the general piping $s$, in which an ejector maintains a sufficient degree of vacuum. Under these conditions the atmospheric pressure by pressing on the diaphragm $q$ raises the counterbalancing-weight $p$ and also the drum $g$. Springs of a sufficient strength bring the brake-gear back and maintain the brake-blocks at rest. Directly the brakeman puts the piping $s$ in communication with the atmosphere the weight $p$ applies the disk $i$ on the tire of the wheel, the rotation of the wheel drives the disk, and with it the drum $g$, and the cord $f$ winds and puts the lever $c$ into the position (shown on the drawing) that corresponds to the braking. If by the rotation of the wheel the tension of the cord $f$ would overcome a certain limit that is determined by the relative length of the arms of the lever $l$, the pull of this cord upon the hook $h$ and the rod $n$ would be sufficient to rotate the levers $l$ and $j$ about their pivot $k$, thus raising the drum $g$, unwinding the cord, and releasing the brake-gear. For example, as to the raising of the drum $g$, $t$ will indicate the tension of the cord $f$, which is the same between $e$ and $i$ as between $e$ and $m$; $p$, the weight of the counterweight $p\,l'$; $l^2\,l^3$, the respective lengths of the perpendicular issued from $k$ to $p$ and to the cords $e\,g$ and $e\,m$, and we shall have the equation $$t\,l^3 > t\,l^2 + p\,l'$$

to operate the elevation of the drum $g$. Consequently the drum will be automatically elevated as soon as the increasing tension of the cord $f$ produces a value for $t$, expressed by the equation $$t > p\,\frac{l'}{l^3 - l^2},$$

and the device will operate as described when $l^3 > l^2$.

As will be easily understood, the intensity of the brakage depends upon the position of the weight $p$ on the lever $o$. It is then very easy to render the intensity of braking proportionate to the load of the car.

The characteristic of this kind of brake is the use of the driving-disk $i$, which comes in contact with the tire of the wheel. By making it with steel, such as the rail, the coefficient of adherence between the disk and the wheel would be the same as it is between the wheel and the rail, preventing sliding or skidding, and thus rendering the action of the disk very effective and not affected by the weather.

It is obvious that the controlling of the brake instead of being effected by means of vacuum could be effected by steam, compressed air, or electricity.

I claim—

1. A railway-brake, controlled by the lever c and the cord f by means of a drum g driven by a disk i which may come in contact with the tire of the wheel, and which is pressed against this tire with a force that depends on the position of the counterbalancing-weight p on the lever o the other end m of which being connected to the rod n which is itself connected by the hook h to the cord f and to an elastic diaphragm q beneath which a vacuum can be created for the purpose of elevating the weight and disk by atmospheric pressure upon the diaphragm, substantially as set forth.

2. In a railway-brake, a lever suitably connected to the brake-gear-controlling bar, a pulley mounted in the lower end of said lever, a pin k, a lever keyed thereto, a drum and disk carried thereby, a lever keyed to said pin, a counterbalanced weight carried thereby, an arm connected to said weighted lever, a rod secured to said arm and provided with a hook, a diaphragm connected to said rod and provided with a suitable cover communicating with a piping, and a cord passing over said pulley and connected at one end to said hook and its opposite end adapted to wind upon said drum.

In testimony whereof I have hereunto set my hand in presence of two subscribing witnesses.

MAURICE VIDIE.

Witnesses:
EDWARD P. MACLEAN,
ALFRED FREY.